United States Patent [19]

Redberg et al.

[11] Patent Number: 5,303,290

[45] Date of Patent: Apr. 12, 1994

[54] SYSTEM FOR ELMINATING GLARE IN VIRTUAL PRIVATE LINE CIRCUITS

[75] Inventors: David A. Redberg, Red Bank, N.J.; David L. Sprague, Haverhill, Mass.

[73] Assignee: AT&T Bell Laboratories, Murray Hill, N.J.

[21] Appl. No.: 800,812

[22] Filed: Nov. 29, 1991

[51] Int. Cl.$^5$ .............................................. H04M 7/10
[52] U.S. Cl. ................................. 379/241; 379/207; 379/221; 379/246
[58] Field of Search ............... 379/241, 230, 207, 216, 379/219, 229, 127, 246, 221; 370/53, 54, 58.1, 58.2, 58.3, 221

[56] References Cited

U.S. PATENT DOCUMENTS

| | | | |
|---|---|---|---|
| 3,637,946 | 1/1972 | Hamrick | 379/241 |
| 4,982,421 | 1/1991 | Kirsch et al. | 379/216 |
| 5,046,181 | 9/1991 | Higuchi et al. | 370/58.1 |

FOREIGN PATENT DOCUMENTS

| | | | |
|---|---|---|---|
| 0063164 | 5/1980 | Japan | 379/241 |
| 0239795 | 10/1986 | Japan | 379/241 |
| 0314496 | 12/1989 | Japan | 379/241 |

OTHER PUBLICATIONS

Engineering and Operations in the Bell System, Second Ed. 1982-1983, Sec. 8.5.5., pp. 292-294.

*Primary Examiner*—Thomas W. Brown
*Attorney, Agent, or Firm*—Barry H. Freedman

[57] ABSTRACT

This application discloses a system for eliminating a busy line condition and completing a call over a virtual private line when the stations at each of the lines attempt to initiate a call simultaneously. The system is implemented in three phases. In a first phase, the busy line condition is detected by either the communication switching system which sets up the virtual private line or by two signal converters, each connected to a station set at each end of the line. In a second phase, the switching system or the converters send terminating supervisory signals towards each station to terminate the attempted initial calls while the stations are still off-hook. In a third phase, a predetermined signal converter or a selected switch in the communication switching system initiates a new call by emitting an originating supervisory signal while the stations are still off-hook.

9 Claims, 9 Drawing Sheets

MEMORY AREA MAP FOR SIGNAL CONVERTER INSTRUCTIONS

FIG. 8

MEMORY AREA MAP FOR SWITCH INSTRUCTIONS

SYSTEM FOR ELMINATING GLARE IN VIRTUAL PRIVATE LINE CIRCUITS

TECHNICAL FIELD

This invention relates generally to a system and method for completing a call over a virtual private line and specifically to a method and system for eliminating the "glare" which occurs when both parties attempt to initiate a call simultaneously over a virtual private line.

BACKGROUND OF THE INVENTION

Virtual private line communication is a service offered by some communication carriers that provides features and functionality similar to the well-known service of dedicated Private Line Automatic Ringdown (PLAR) between two end points. The virtual private line service (also known as "virtual hot line") was designed to replace, cost effectively, the expensive PLAR service that establishes a permanent point-to-point physical connection between two communication devices. Accordingly, the major features of PLAR, such as very short call setup time and secure communication between a calling and a called party, are also offered in the virtual private line service. Unlike PLAR, a virtual private line uses, as part of a communication switching system, a common software defined network to connect via trunks both ends of a circuit for the purpose of allowing an automatic connection to be established for the duration of a call, upon origination from either end. Subscribers of the virtual private line service, such as security traders in the financial industry, governmental security agencies and the armed forces attach a very high degree of importance to the "almost instantaneous connection" requirement of the service. To that end, most carriers have implemented a design wherein the mere lifting of a station's handset by the calling party automatically and virtually instantaneously results in a ringing tone at the called party's telephone set.

Equally important to virtual hot line subscribers is the requirement of guaranteed access to the party at the other end of the line. More specifically, subscribers of this service want the phone at one end of the line to always ring without any possibility of a busy tone upon lifting of the handset by a caller at the other end of the line. Dedicated private lines, by virtue of the permanent physical connection between the two communicating devices, can guarantee their subscribers access to parties at either end of the line. Aiming to meet this requirement for virtual private lines, in U.S. Pat. No. 4,982,421 issued on Oct. 27, 1989 to Kirsch et al. the inventors of that patent disclose a system for virtual private lines that uses non-dialable routing numbers devised by a software defined network to establish a connection between the two ends of the line. The use of the non-dialable routing number technique allows each end of the virtual private line connected to an access/egress switch to reach and to be reached only by the other end of the circuit because other potential calling parties have no way of activating the non-dialable routing number. Thus, the Kirsch et al. system partially meets the guaranteed access requirement of virtual private line subscribers by preventing inadvertent and unwanted calls from external parties who are not connected to the virtual private line from blocking access to the circuit. However, neither the Kirsch et al. system nor any other system in the prior art can prevent the software defined network from emitting busy signals in the instance of a "simultaneous" trunk seizure condition that occurs when both stations of the virtual private line try to establish a connection simultaneously (i.e. within the range of call setup time). This deficiency, which is called "glare", takes special significance when one considers that higher-than-usual incidences of busy signals can be reasonably expected for virtual private line service, since both parties would tend to initiate calls using the hot line within the same time window upon occurrence of special events requiring immediate communication between the parties.

SUMMARY OF THE INVENTION

In accordance with our invention, a system and method are disclosed to prevent busy tone signals from reaching the station sets and to complete a call over a virtual private line when both ends of the line "simultaneously" attempt to initiate a call. A "simultaneous" call attempt for a virtual private line can occur within the time window delimited by 1) the emission of an off-hook signal on one end of the line followed by attendant call setup delay, and 2) trunk seizure at the other end of the line caused by reception of an off-hook signal. In our invention, the simultaneous trunk seizure is first detected by one or more components of the communication switching system before the callers receive any busy tone signals. While callers are still off-hook, access and egress trunks are cleared by the emission of terminating supervisory signals by the same component(s) which detected the simultaneous trunk seizure condition. Once the links (meaning trunks or lines) are cleared, a new call is reinitiated by one component connected to one station set sending an originating supervisory signal towards the other station set, typically using a signaling network interconnecting some components of the communication switching system also called a communication switching complex.

According to one embodiment of our invention, before busy tone signals can be received by the calling parties, a simultaneous trunk seizure condition is detected by each switch which serves each station and constitutes part of the communication switching system that sets up the virtual private line. The detection of the simultaneous trunk seizure condition triggers the release by each switch of a message over the signaling network connecting the switches. This message, which is a terminating supervisory signal directed from one switch to the other, indicates that the access and egress trunks of the virtual private line have to be cleared. Upon reception of that message, each switch relinquishes control of the link connecting it to the station set in order to free that trunk for a new call from the station at the other end of the line. After a short pause to insure that both trunks have been cleared, one of the switches reinitiates the call by sending to the other switch, via the signaling network, a new call initiation message in the form of an originating supervisory signal. Embedded in the call initiation message is a non-dialable routing number for the call derived from the translation of the access line identification number to a routing number. After receiving the new call initiation message, the egress switch translates the routing number embedded in that message to the trunk identification number of the egress trunk using well-known table look-up techniques. Once the egress trunk is identified, the egress switch seizes that trunk to establish a communication path between both stations of the virtual private line to complete the call. The determination of which switch reinitiates the call can be based on some arbitrary criteria, such as the logical address assigned to each switch by the signaling network.

In another embodiment of our invention, signal converters, each placed between a station and the switch serving that station, are used (instead of the switches themselves) to clear the trunks and reinitiate the call. In this embodiment, once the busy tone signal is detected by the signal converters, both converters send terminating supervisory signals, such as on-hook signals, towards their respective switches, thereby clearing both access/egress trunks and terminating both simultaneously attempted calls. After a short pause to insure that both trunks have been cleared, a predetermined signal converter designated as a "dominant" converter, reinitiates the call by sending an off-hook signal towards its serving switch while the other converter, designated as a subservient converter, stays passive with respect to setting up the call. The switch serving the dominant converter uses the routing number derived from its own routing table to send a call initiation message to the switch connected to the subservient converter to complete the call. Subsequent actions follow the pattern described above in the first embodiment of the invention.

In the instance when both access and egress trunks of the virtual private line are connected to the same switch, the access and egress ports of that switch detect the simultaneous trunk seizure before the calling parties become aware of such condition. In that case, the switch instructs its ports attached to the access/egress trunks to relinquish control of those trunks, thereby terminating both simultaneously attempted calls. Then, the switch reinitiates the call by seizing the access and egress trunks and translating the routing number to the trunk identification number of the egress line, thereby establishing a communication path between its access and egress ports of the virtual private line.

BRIEF DESCRIPTION OF THE DRAWING

In the drawings:

FIG. 5 shows a graphical representation of signals and call processing messages sent over a software defined network. FIG. 5 also depicts the time window within which simultaneous trunk seizure can occur when one party attempts to originate a call after the outgoing trunk has been reserved by the switch at the other end of the line for the purpose of completing a call;

DETAILED DESCRIPTION

Figure 1:
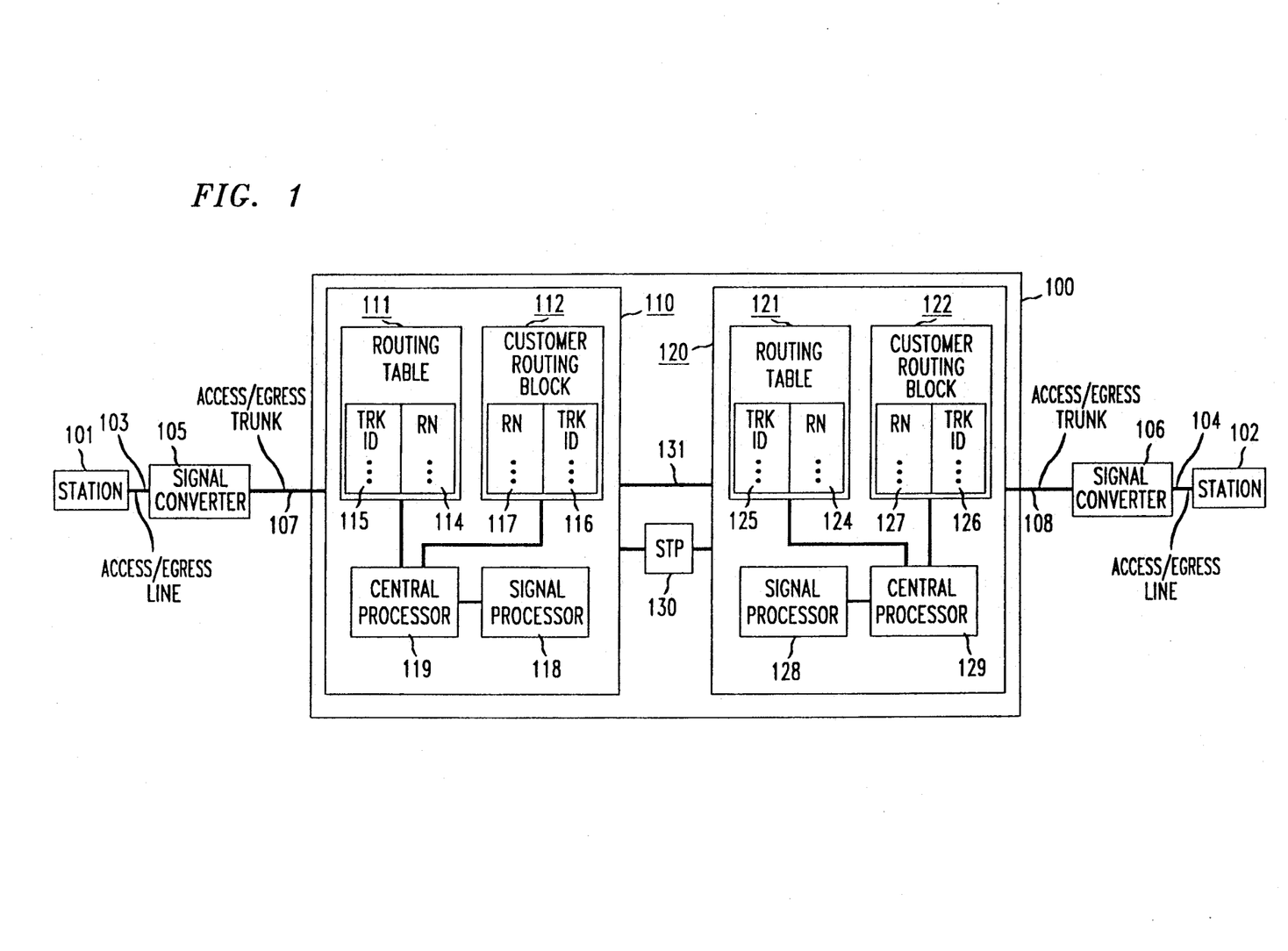
FIG. 1 shows, in block diagram form, a communication switching system designed to eliminate glare resulting from simultaneous trunk seizure in a virtual private line in accordance with our invention.

FIG. 1 shows, in block diagram form, a configuration for a communication switching system designed to eliminate glare in a virtual private line arrangement. In FIG. 1, station sets 101 and 102 are shown linked via access/egress lines 103 and 104 to signal converters 105 and 106, respectively. The latter are connected via access/egress trunks 107 and 108 to communication switching system 100 comprised of switches 110 and 120 and a signaling network represented by Signal Transfer Point (STP) 130. Switches 110 and 120 are processor-controlled, software-driven switching systems that operate as points of access to and points of egress from, communication switching system 100 for station sets 101 and 102 at both ends of the virtual private line. They also serve as access points to a Common Channel Signaling network (represented as described below by STP 130) for communication switching switching system 100. Signal processors 118 and 128 in switches 110 and 120, respectively, are wired-logic processing units that a) scan for supervisory changes and b) receive and transmit signals to other switches directly through intermachine trunk 131 or via the signaling network represented by STP 130. Central processors 119 and 129 in switches 110 and 120, respectively, provide path information to route a call over the network. Switches 110 and 120 may be implemented using the AT&T No. 4ESS switch or the AT&T 5ESS TM switch. A detailed description of the structure of the AT&T 5ESS TM switch is provided in *AT&T Technical Journal*, Vol. 64, No. 6, part 2, pp. 1305–1564, July/August 1985. The features and functionality of the AT&T No. 4ESS switch are explained extensively in *Bell System Technical Journal* (BSTJ), Vol. 56, No. 7, pp. 1015–1320, September, 1977. In addition, the Kirsch et al. U.S. Pat. No. mentioned earlier discloses the structure of a No. 4ESS switch within the context of a virtual private line service using a software defined network.

When switch 110 (120) acts as an access switch, it translates off-hook signals received from station 101 (102) to a non-dialable routing number by accessing routing table 111 (121). Routing tables 111 and 121 are translation tables, each of which correlates a routing number to a trunk identification number. Conversely, when switch 110 (120) acts as an egress switch, it translates the routing number received from access switch 110 (120) to the trunk identification number of the egress trunk by accessing customer routing block 112 (122). Alternatively, a translation table in each switch-called a customer data block-can, as explained in the Kirsch et al. patent, match the identification number of an incoming trunk to a non-dialable Automatic Number Identification (ANI) which is forwarded to a routing database in the network. The routing database, in turn, translates the ANI to a routing number associated with the trunk identification number of the station at the other end of the line.

In addition to all the functionality mentioned above, switches 110 and 120 can also perform call maintenance and terminations functions described below.

Switches 110 and 120 exchange call handling messages via a data network called the Common Channel Signaling network. The latter is a packet switching network composed of a plurality of interconnected nodes called Signal Transfer Points (STPs) that are used to exchange call handling messages between switches according to a specific protocol, such as CCS7. However, for the sake of simplicity, the signaling network is represented in FIG. 1 by a single Signal Transfer Point, namely STP 130. The features and functionality of an STP are described in the book *"Engineering and Operations in the Bell System,"* Second Edition, pp 292-294, AT&T Bell Laboratories Inc., 1982

Signal converters 105 and 106, which may be implemented, for example, as stand alone units or as circuit packs within a D4 channel bank, perform two primary functions. The first function is needed when stations 101 and 102 in FIG. 1 are analog, and access/egress switches 110 and 120 are digital. In that event, signal converters 105 and 106 are arranged to convert analog loop start/ground start signals received from the analog station sets to digital bit streams in a specific format (such as E&M) ordinarily used in digital switches. Similarly, digital bit streams from switches 110 or 120 are converted into analog signals recognizable by the analog station sets. The analog to digital conversion function is not needed when both ends of the virtual private line are connected to digital telephone sets.

Secondly, signal converters 105 and 106 provide call setup and call termination maintenance functions to avoid misinterpretation of signals exchanged between stations 101 and 102 and switches 110 and 120, at the beginning and at the end of conversations between the parties using the virtual private line. For example, if, at the end of a conversation, one of the parties delays hanging up the phone, that delay could be erroneously interpreted as a new off-hook condition indicating a request to initiate a new call. To avoid this situation, the signal converter connected to that station must send an on-hook signal to the switch to avoid false ringing at the far end station. Other examples of call set-up and termination maintenance functions performed by signal converters 105 and 106 include provisions for early call abandonment, and proper "tearing down" of connections at call termination time. The call setup and termination functions performed by signal converters 105 and 106 are needed for analog as well as digital stations. As mentioned above, the call maintenance and termination functions can also be performed by switches 110 and 120.

Before explaining in detail how the glare condition is cured and how a new call is reinitiated transparently to the callers in accordance with our invention, a general description of the processes that lead to a simultaneous trunk seizure condition in a virtual hot line arrangement using signal converters will provide continuity and clarity to the rest of this disclosure.

Figure 2:
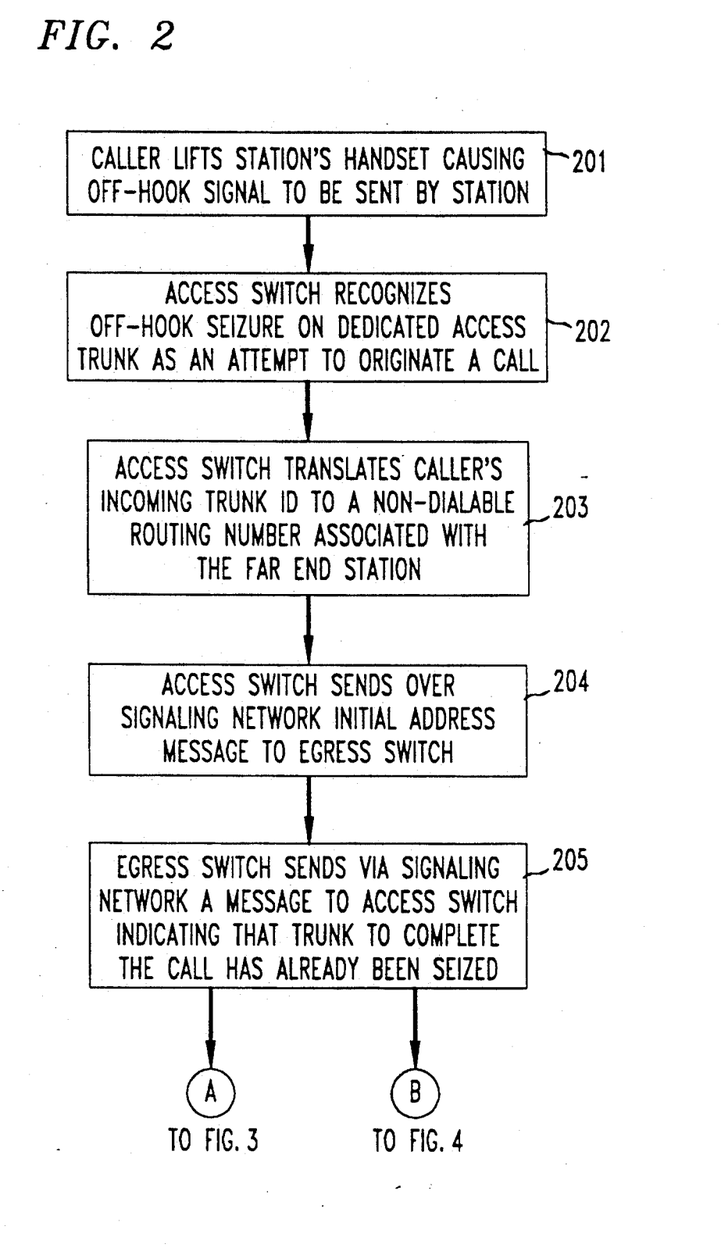
FIG. 2 is a flowchart outlining different steps performed by various components of a communication switching system resulting in simultaneous trunk seizure over a virtual private line.

Referring to FIG. 2, the call initiation process is set in motion, in step 201, by a caller at station set 101 (for example) lifting the handset, which causes an off-hook signal to be received by signal converter 105 via access/egress line 103. Signal converter 105 then forwards the off-hook signal to switch 110 via access/egress trunk 107. Within the same call setup time range, a caller lifts the handset of station set 102 causing an off-hook signal to be sent via access/egress line 104 to signal converter 106, which forwards that signal to switch 120. From that point on, the process becomes totally bilateral, i.e. the functions performed in this process are carried out separately by each switch and its attendant components independently of similar functions performed concurrently by their counterparts at the other end of the virtual private line. Furthermore, the same switch plays two different roles in this process. For example, switch 110 is an access switch for station set 101 but plays the role of an egress switch for station set 102. Conversely, switch 120 is an access switch for station set 102 but represents an egress switch for station set 101. In step 202, signal processors 118 and 128 in switches 110 and 120 respectively, recognize the off-hook signals received from station sets 101 and 102 as an attempt to originate a call. Accordingly, in step 203, switches 110 and 120 use routing tables 111 and 121 respectively to translate the incoming trunk ID of access lines 103 and 104 into a non-dialable routing number. Then in step 204, each switch independently starts the call set-up process by sending over the signaling network an Initial Address Message (IAM) to its counterpart egress switch, namely, switch 110 or switch 120. An IAM is a signal sent by an access switch to an egress switch for the purpose of initiating trunk seizure of an egress trunk. An IAM ordinarily contains a routing number and other information necessary for the routing and handling of a call. After receiving the non-dialable routing number in the IAM, signal processors 118 and 128 send instructions to central processors 119 and 129 to use data stored in Customer Routing Block 112 and 122 to translate the non-dialable routing number to the trunk identification number associated with trunks 107 and 108 respectively. Once the trunk ID numbers of egress lines 107 and 108 are identified, central processors 119 and 129 try to reserve access/egress lines 103 and 104 to complete the call by attempting to seize them. Upon finding that egress trunk 107 or 108 has already been seized, switch 110 and 120 in step 205, return an "egress busy" message to the access switch.

As mentioned above, our invention can be implemented in two alternative embodiments. The first embodiment uses the call processing capabilities of switches 110 and 120 to eliminate glare, while the second embodiment takes advantage of the signal detection and generation features of signal converters 105 and 106 in FIG. 1. A description of the different steps performed by switches 110 and 120 leading to call completion over the virtual private line is provided in FIG. 3, while FIG. 4 describes the actions and decisions taken by signal converters 105 and 106 to complete the call.

A. Switch Implementation

Figure 3:
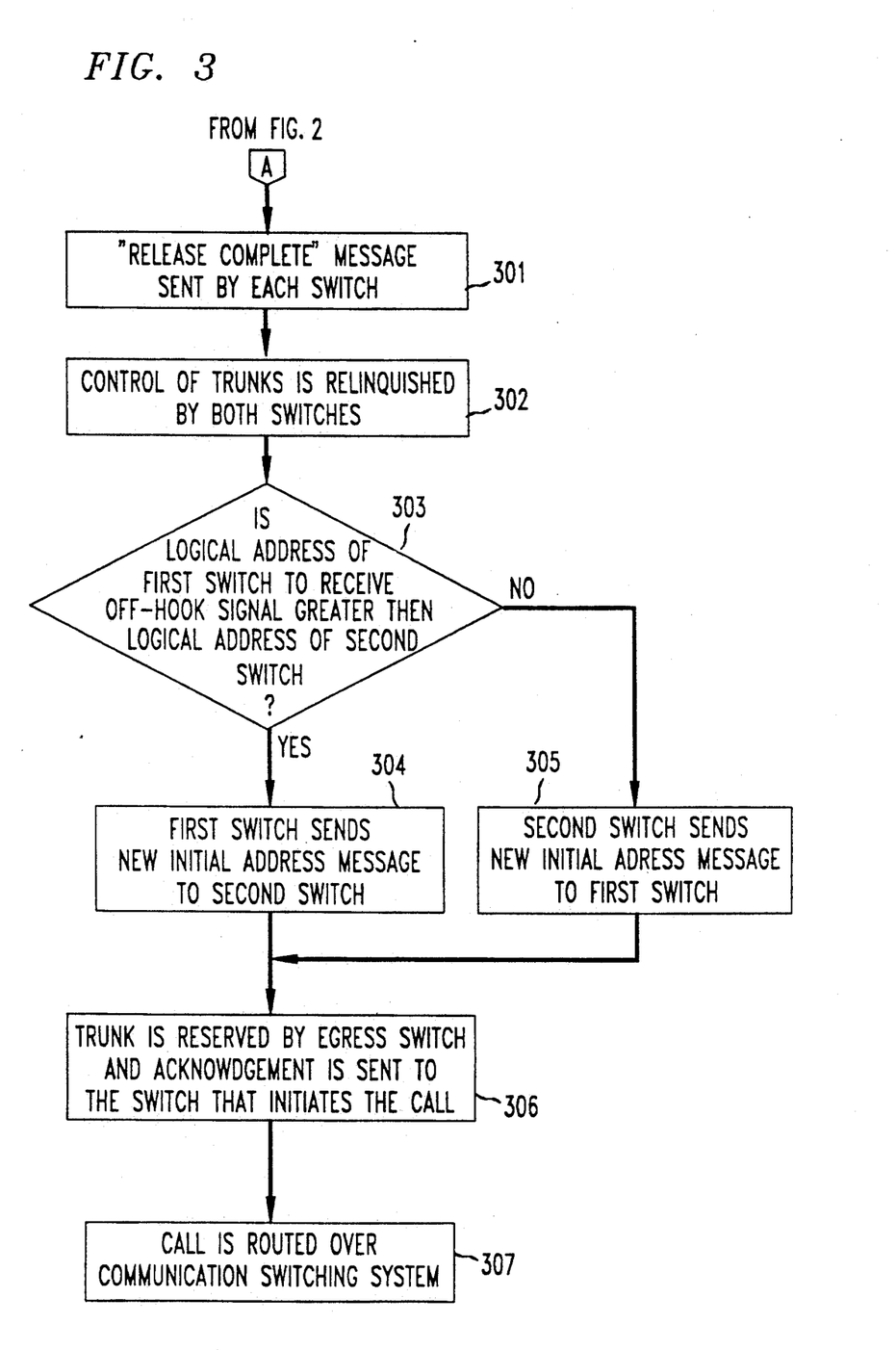
FIG. 3 presents, in flow diagram format, actions taken and decisions formulated by the switch(es) of a communication switching system to establish a connection in case of simultaneous trunk seizure.

Referring to FIG. 3, the detection of the busy line condition by signal processors 118 and 128 causes access switch 110 and 120, in step 301, to send a "RELEASE COMPLETE" signal to egress switch 110 or 120. A "RELEASE COMPLETE" message is a standard signal ordinarily triggered by emission of an on-hook signal, directing the port of a switch to relinquish control of an egress trunk for the purpose of freeing the trunk for subsequent calls. The end result of the "RELEASE" messages is to clear access/egress trunks 107 and 108 in step 302, thereby terminating both simultaneously attempted calls, paving the way for a new call to be initiated without the callers having to go on-hook. Once control of access/egress trunks 107 and 108 is relinquished by switches 110 and 120, an arbitrary but uniform scheme for all switches in the communication switching system determines which switch will reinitiate the call. For example, switches 110 and 120 can exchange messages indicating the value of their respective logical address assigned by the signaling network. In step 303, the logical addresses are compared to determine which switch has the higher address. In steps 304 and 305, the switch with the higher address sends a new Initial Address Message (IAM) over STP 130 to the other switch to initiate a new call. Assuming that switch 110 has a higher logical address than switch 120, then switch 110 in step 303 or 304 sends the routing number associated with egress trunk 108 to switch 120. The latter matches the received routing number to the trunk identification number associated with egress trunk 108 in Customer Routing Block 122. Switch 120 then seizes egress trunk 108 and in step 306, sends an acknowledgement message to switch 110 indicating that the call can be routed over communication switching system 100 to station set 102. In step 307, the call is routed over communication switching system 100. In this embodiment of our invention, the call maintenance and termination functions described above for the signal converters, are ported to switches 110 and 120.

Figure 1A:
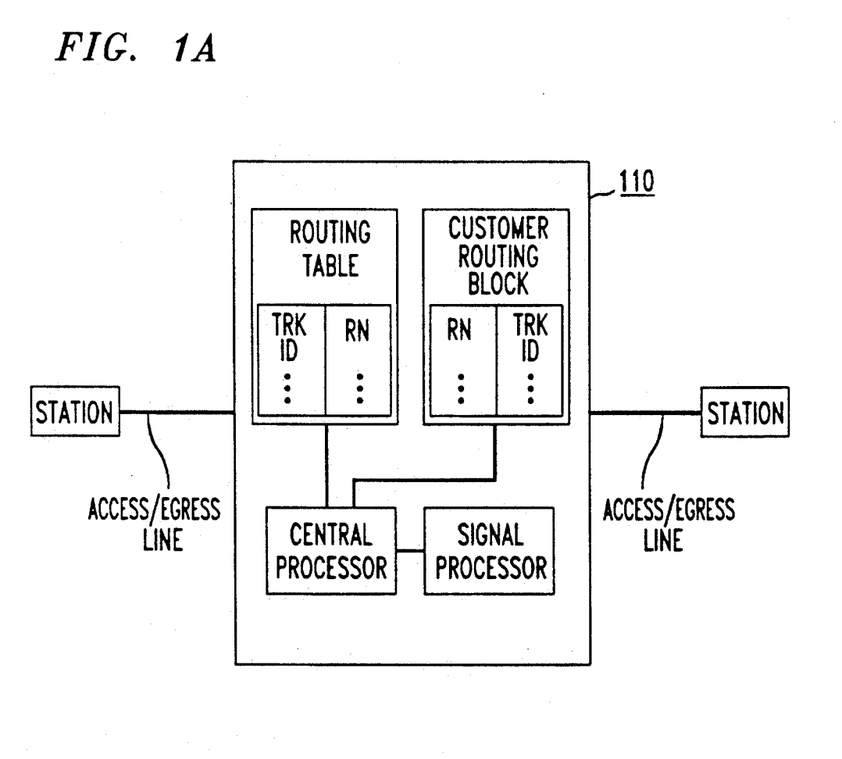
FIG. 1A depicts a switch arranged to eliminate glare due to simultaneous trunk seizure in virtual private lines.
Figure 1B:
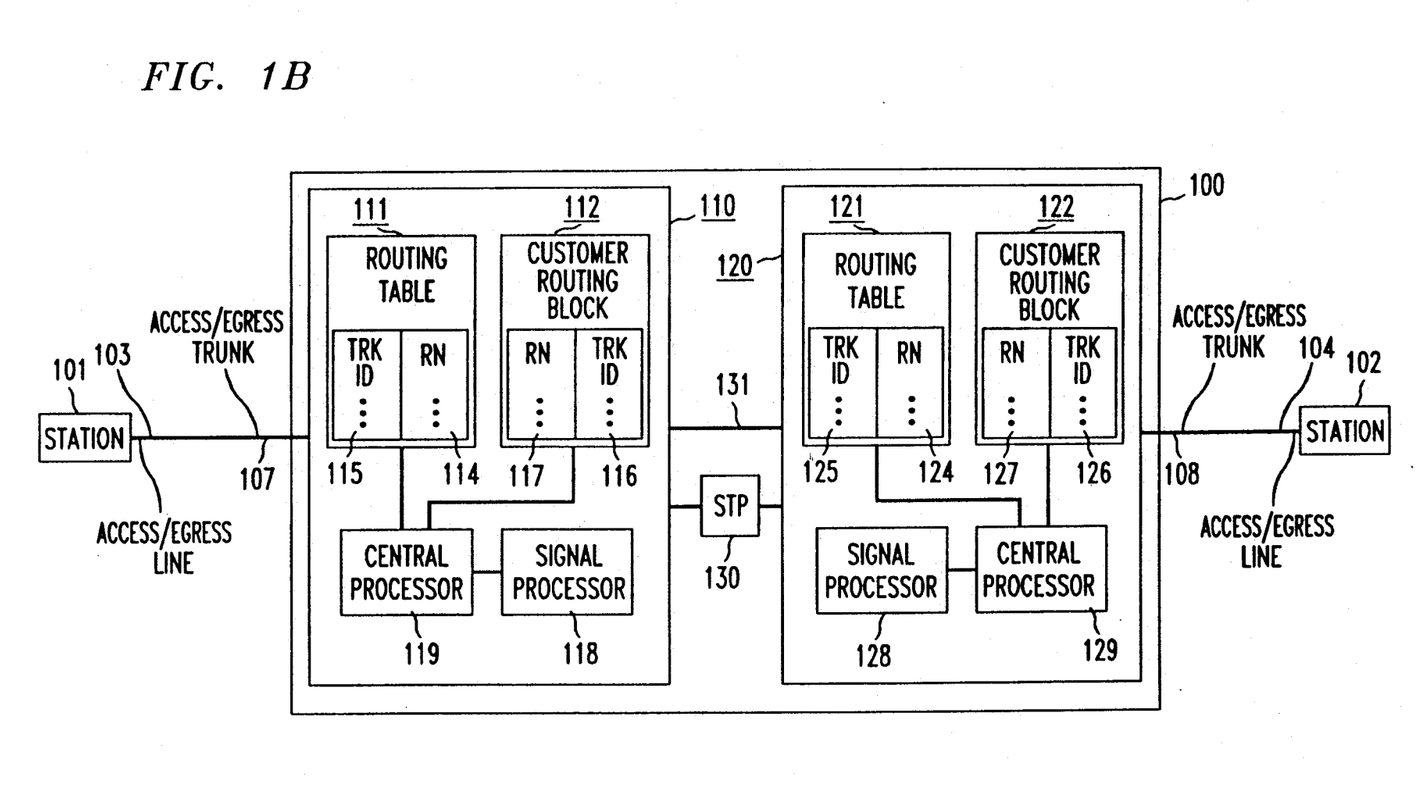
FIG. 1B shows an illustrative communication switching system arranged to eliminate glare caused by a simultaneous trunk seizure condition in a virtual private line.

Alternative implementations of the system shown in FIG. 1 are illustrated in FIG. 1A and FIG. 1B. A single switch example of the invention is depicted in FIG. 1A. Shown in FIG. 1B is a block diagram of a communication switching system arranged to implement the invention for the limited cases in which the call setup and termination maintenance functions are implemented in switches 160 and 170.

Before explaining the second embodiment of our invention, a detailed description of a signal converter, which plays a key role in that embodiment may be helpful.

Figure 6:
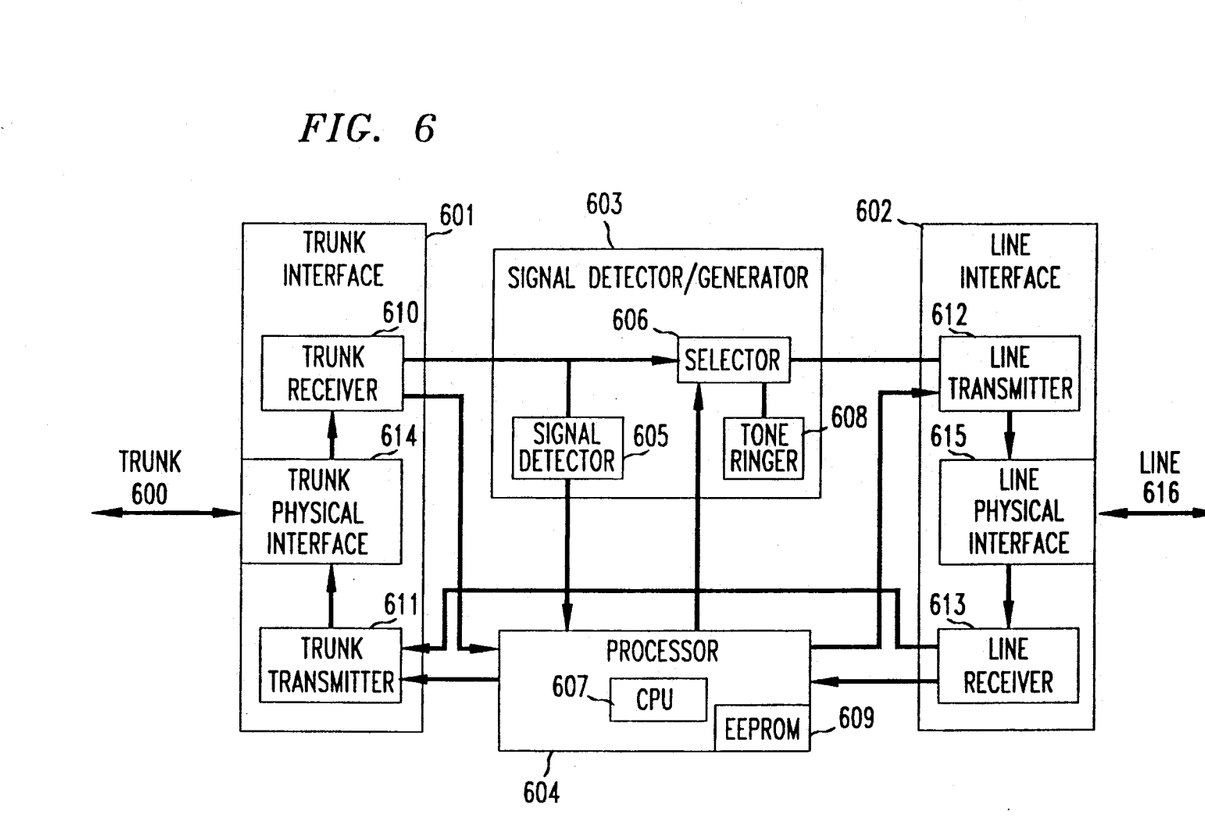
FIG. 6 shows a signal converter arranged in accordance with our invention.

As shown in FIG. 6, the signal converter depicted in that drawing is comprised of modular elements which include trunk interface 601, line interface 602, signal detector/generator 603, and processor 604.

The function of trunk interface 601 is to provide the signal converter of FIG. 6 with trunk receiver and trunk transmitter capability. Trunk receiver 610 recovers a 64 kb/s signal from trunk physical interface 614 and demultiplexes it into voice frequency information and signaling information, including originating and terminating supervisory signals. The voice frequency information is forwarded to signal detector/generator 603 and the signaling information is passed to processor 604. Trunk transmitter 611 multiplexes voice frequency information from line interface 602 and signaling information from processor 604 for transmission on trunk 600 via trunk physical interface 614.

The function of line interface 602 is to provide the signal converter of FIG. 6 with line receiver and line transmitter capability. Line receiver 613 recovers a 64 kb/s signal from line physical interface 615 and demultiplexes it into voice frequency information and signaling information. The voice frequency information is provided to trunk transmitter 611 in trunk interface 601 while the signaling information is provided to processor 604. Line transmitter 612 multiplexes data from signal detector/generator 603 and signaling information from processor 604 for transmission on line 616 via line physical interface 615.

Figure 7:
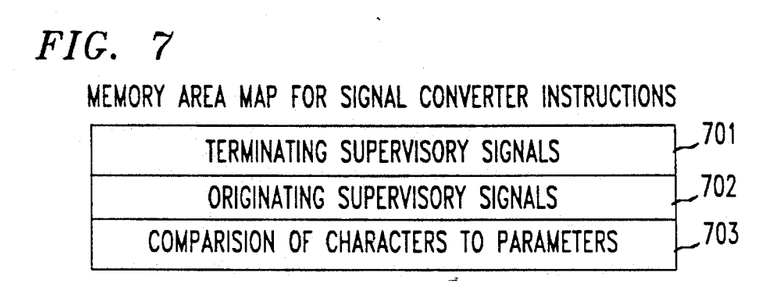
FIG. 7 shows a set of instructions stored in the memory of a signal converter.
Figure 8:
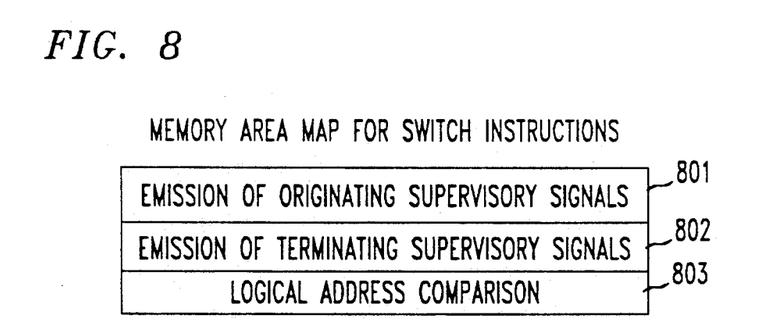
FIG. 8 displays a set of instructions stored in the memory of a switch.

The function of signal detector/generator 603 is to scan for busy signals within the data received from trunk interface 601 by periodically monitoring all signals coming from trunk 600 using well-known sampling techniques. In addition, signal detector/generator 603 generates audible call progress tones (such as ringing) for transmission to line interface 602 and provides a connection between trunk interface 601 and line interface 602. The components of signal detector/generator 603 include signal detector 605, tone ringer 608, and selector 606. Signal detector 605 continuously monitors trunk interface 601 to report to processor 604 any incoming busy signal sent by switches 110 and 120 via trunk interface 601. Tone ringer 608 generates audible ringing signals and transmits those signals to selector 606. Selector 606 plays the role of a switch for signal detector/generator 603. It connects trunk interface 601 with line interface 602 and also provides a communication path between tone ringer 608 and line interface 602. Processor 604 is comprised of Central Processing Unit (CPU) 607 and memory storage facilities such as Electrically Erasable Programmable Read-Only Memory (EEPROM) represented by EEPROM 609. Processor 604 executes instructions stored in EEPROM 609 to perform call setup and termination functions. In addition, processor 604 coordinates timing of signals to and from trunk interface 601 and line interface 602, permitting the completion of calls over the virtual private line. EEPROM 609 also stores the internal logic of the converter. A sample of the instructions stored in EEPROM 110 is provided in FIG. 7.

B. Signal Converter Implementation

Figure 4:
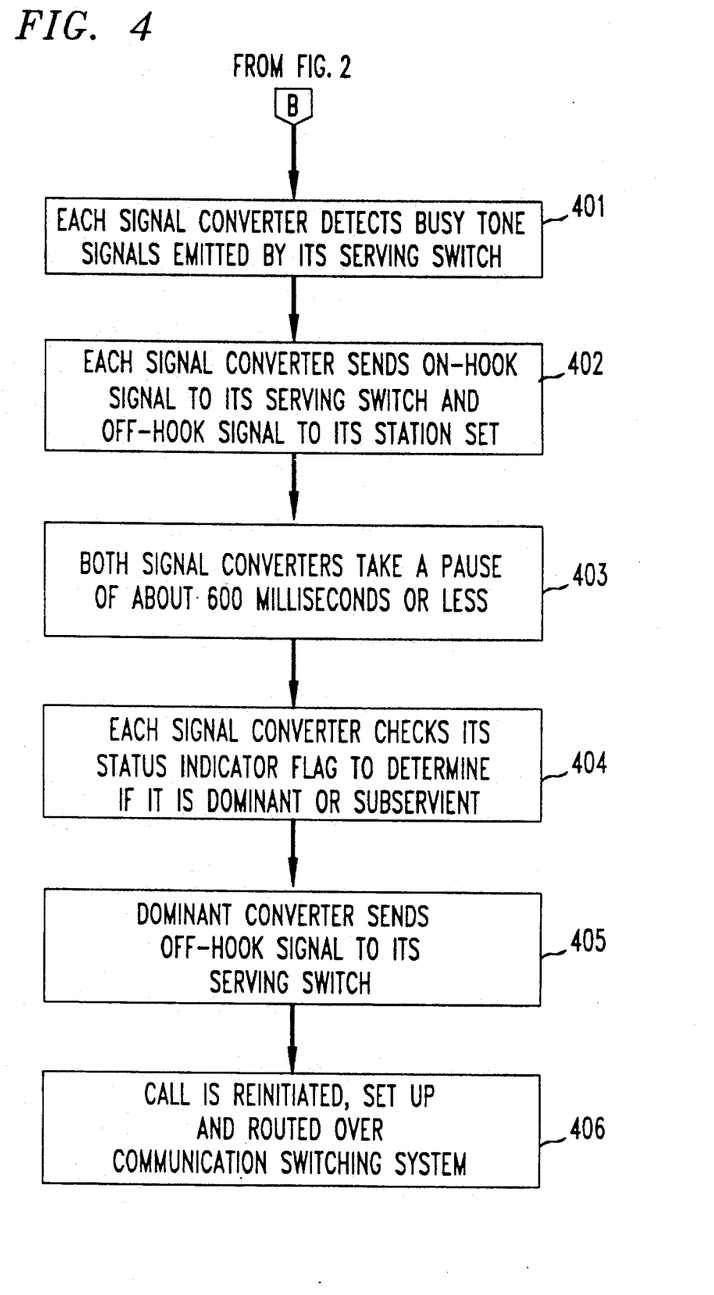
FIG. 4 represents a flow diagram of actions taken and decisions formulated by the signal converters of a communication switching system to establish a connection over a virtual private line in case of simultaneous trunk seizure.
Figure 5:
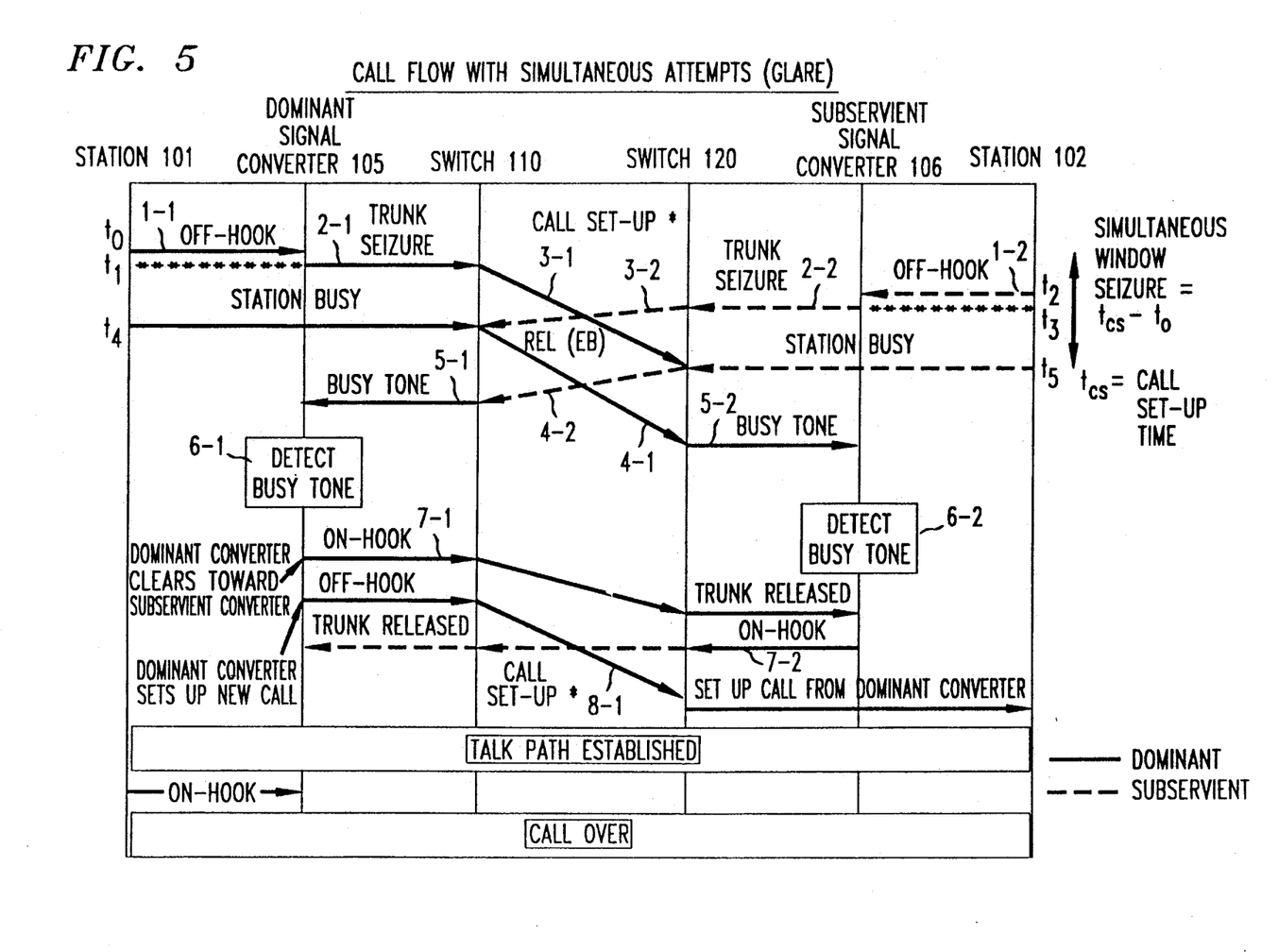

The steps describing how our invention is implemented in the signal converters are discussed in FIG. 4 and pictorially shown in FIG. 5. FIG. 4 provides a step by step description of the glare elimination process while FIG. 5 offers a more functional and symmetrical description of the same process.

Referring to FIG. 4, the simultaneous trunk seizure condition causes switches 110 and 120 to send busy tone signals to station sets 101 and 102. Those busy signals are detected by signal detector 605 and subsequently blocked in step 401, by selector 606 of signal converters 105 and 106 before those signals can reach station sets 101 and 102. Signal converters 105 and 106, in step 402, use processor 604 to send on-hook signals to switches 110 and 120. In addition, signal converters 105 and 106 send ringing signals to station sets 101 and 102. The on-hook signal is interpreted as a "RELEASE" message by switches 110 and 120 which return "RELEASE COMPLETE" messages back to the signal converters. The net effect of sending the on-hook signals to switches 110 and 120 is that those switches relinquish control of access/egress trunks 107 and 108, thereby terminating the initially attempted calls. In step 403, signal converters 403 and 404 pause for about 600 milliseconds or less to allow the line to be cleared at both ends. In step 404, each signal converter uses processor 604 to check the value of the status indicator flag stored in EEPROM 609 of the converter to determine if the signal converter is dominant or subservient. The value of the status indicator flag is set in advance when the virtual private line is established. This is accomplished for example, by assigning a value of "1" to the status indicator flag to designate a signal converter as a dominant converter, while a value of "0" is used to identify a signal converter as a subservient converter. Unlike switches which can serve multiple virtual private lines and which can be paired to a plurality of other switches to provide virtual private line service to various subscribers, a pair of signal converters is dedicated to each virtual private line. Accordingly, the function of reinitiating a call has to be assigned on a predetermined basis to one of the signal converters. In step 405, the dominant converter sends an off-hook signal to its serving switch to reinitiate the call. For example, if signal converter 105 is the dominant converter, then it would use processor 604 to send an off-hook signal to switch 110 which would reinitiate the call by sending a new Initial Address Message (IAM) to switch 120. In step 406, the call is routed pursuant to call processing techniques described in the Kirsch et. al. patent mentioned earlier.

Referring to FIG. 5, that drawing shows a graphical representation of 1) changes in different components of the network, as two simultaneously initiated calls progress independently towards a simultaneous trunk seizure condition, and 2) how the new call is initiated and completed over the virtual private line. FIG. 5 displays time on the vertical axis, with events occurring first appearing above later occurring events. Looking at FIG. 5 from a vertical perspective, it can be observed that each column in FIG. 5 from top to bottom indicates changes over time in the logical state of a component or of links between components of a communication switching system arranged in accordance with our invention.

With respect to the horizontal dimension, each column in FIG. 5 has a demarcation line indicated by the name of a component instigating or being the object of the change, such as 1) station 101 in the upper left hand corner, 2) dominant signal converter 105 located on the right hand side of station 101, 3) switches 110 and 120 in the middle of the top row, 4) station 102 in the upper right hand corner and finally, 5) subservient signal converter 106 on the left hand side of station 102. Thus, a horizontal view of FIG. 5 shows the flow of a call over a virtual private line as it traverses different links and components of a communication switching system arranged in accordance with our invention.

In FIG. 5, changes triggered by an off-hook signal from station 101 are depicted with solid lines, while similar changes due to an off-hook signal from station 102 are distinguished from the former by broken lines. FIG. 5 makes it easy to see graphically, the process by which a simultaneous trunk seizure condition can occur. Significant events in the process are identified by numerals within each column. For example, event 1-1, is triggered by a change from an on-hook to an off-hook condition for station 101 at time $t_0$. The off-hook signal sent at $t_0$ by station 101 to dominant signal converter 105 causes a change from idle to busy in the link between the station and the signal converter. Thereafter, at time $t_1$ ($t_1 > t_0$), the transmission of the off-hook signal by dominant signal converter 105 to switch 110 in event 2-1, causes a change in the state of the trunk between dominant signal converter 105 and switch 110 from idle to seized.

At some time $t_2$ after $t_1$, station 102 also goes off hook in event 1-2. As a result, in event 2-2, signal converter 106 transmits the off-hook signal received from station 102 to switch 120, thereby causing a change in the state of the trunk between converter 106 and switch 120 from idle to seized at time $t_3$.

Switches 110 and 120 each now communicate with one another, in events 3-1 and 3-2, in order to set up the call. When switch 120 signals switch 110, it determines at time $t_4$ that the egress trunk to complete the call has already been seized. By the same token, when switch 110 signals switch 120, it determines at time $t_5$ that the egress trunk to station set 102 has also been seized. An attempt is now made by each switch in events 4-1 and 4-2 to communicate the busy status back to its associated originating station. Thus, in event 5-1, switch 110 applies a busy tone to the trunk connecting it to the dominant signal converter 105. Likewise, in event 5-2, switch 120 applies a busy tone to the trunk linking it to subservient signal converter 106. Thus, from FIG. 5, it can be observed that a simultaneous trunk seizure condition occurs when stations 101 and 102 attempt to initiate calls within a call set up time window of length $t_{cs}$, which is the longer of the time intervals between $(t_3 - t_1)$ and $(t_5 - t_2)$ i.e., the time interval during which a busy signal may occur and a virtual hot line call cannot be completed.

FIG. 5 illustrates the bilateral aspect of the signal converter implementation of our invention. The simultaneous trunk seizure condition causes in events 5-1 and 5-2, emission of busy tone signals by switches 110 and 120. The busy tone signals are detected in events 6-1 and 6-2 by signal detectors in the dominant and subservient converters which proceed in events 7-1 and 7-2, to send on-hook signals to their respective serving switches namely, switches 110 and 120 respectively. Upon reception of the on-hook signals by their signal processor (118 and 128), switches 110 and 120 send "RELEASE COMPLETE" messages to each other, to relinquish control of the egress trunks and, thereby effectively terminating the attempted initial calls. Signal converters 105 and 106 then, determine which one will reinitiate the call by checking the status indicator flag as described above. FIG. 5 shows the signal converter linked to station 101 as the preselected dominant converter. FIG. 5 also graphically illustrates the difference in time between the two detection occurrences 6-1 and 6-2, wherein event 6-2 occurs some time after event 6-1 has taken place. Because of the time difference in the detection of the busy signals, the dominant converter is arranged to pause for a predetermined time interval, typically less than 600 milliseconds, to insure that both ends of the line are free, before sending an off-hook message to switch 110 for the purpose of initiating a new call, which is set up and routed using techniques described in the Kirsch et. al. patent mentioned earlier.

With this invention, virtual private line service can now offer the same features and functionality of dedicated private lines in a manner that is operationally transparent to the subscribers at a fraction of the cost. In addition, the switch embodiment of our invention, by using arbitrary criteria to determine the switch that reinitiates the call, offers communication carriers the flexibility of pairing any set of switches in their network to provide virtual private line service to their subscribers. Conversely, the signal converter embodiment of our invention provides a glare elimination solution that may be quickly implemented in a circuit pack within a D4 channel bank. Thus, the signal converter embodiment offers communication carriers a solution to eliminate glare that can be quickly implemented without any disruption of a carrier's communication switching system that may negatively impact delivery of other communications services.

The above description is to be construed as only an illustrative embodiment of this invention. Persons skilled in the art can easily conceive of alternative arrangements providing functionality similar to our invention without any deviation from the fundamental principles or the scope of this invention.

We claim:

1. In a switching system arranged to establish a virtual private line connection between a first station and a second station, with each of said stations having a separate link to a communication switching system which i) sets up said virtual private line and ii) allows said stations to communicate only with each other, a method of eliminating a busy line condition which arises when said first station initiates a first call to said second station and said second station simultaneously initiates a second call to said first station, wherein said method comprises the steps of:

(a) detecting said busy line condition by monitoring the status of signals on each said link;
   (b) clearing each said link by sending terminating supervisory signals towards said first and second stations while said stations are still off-hook; and
   (c) initiating a new call over said virtual private line by sending an originating supervisory signal towards one of said stations while said stations are still off-hook.

2. The method of claim 1, wherein said communication switching system includes at least one switch, and wherein steps (a), (b), and (c) are performed in said switch.

3. In a communication switching complex arranged to establish a virtual private line connection between a first station and a second station, with each of said stations having a separate link to said communication switching complex which i) sets up said virtual private line and ii) allows said stations to communicate only with each other, a system of eliminating a busy line condition which arises when said first station initiates a first call to said second station and said second station simultaneously initiates a second call to said first station, wherein said system comprises:

(a) means for detecting said busy line condition by monitoring the status of signals on each said link;
   (b) means for clearing each said link by sending terminating supervisory signals towards said first and second stations while said stations are still off-hook; and
   (c) means for initiating a new call over said virtual private line by sending an originating supervisory signal towards one of said stations while said stations are still off-hook.

4. The system of claim 3, wherein said communication switching complex includes at least one switch having said detecting means, said clearing means and said new call initiating means.

5. The system of claim 3, wherein said communication switching complex is comprised of at least a first switch and a second switch, each switch serving only one of said stations, and wherein only one of said switches includes said means for initiating said new call.

6. A method for eliminating a glare condition arising from two virtual private line calls initiated substantially at the same time by a) a first station connected to a first switch by a first link, and b) a second station connected to a second switch by a second link, said switches being part of a communication switching system which allows said stations to communicate only with each other, wherein said method comprises the steps of:

detecting in each switch said busy line condition;
   releasing said first link from said communication switching system control through the transmission of terminating supervisory signals by said second switch to said first switch while said stations are still off-hook;
   releasing said second link from said communication switching system control through the transmission of terminating supervisory signals by said first switch to said second switch while said stations are still off-hook; and
   selecting based on a predetermined criterion only one of said switches to initiate a new call, said new call being initiated by the selected switch sending an originating supervisory signal towards the non-selected switch while both stations are still off-hook.

7. A method for completing simultaneously initiated virtual private line calls in order to establish a connection over a virtual private line between a first station and a second station which initiated said calls, wherein each station is connected via a line to a signal converter coupled to a communication switching system which sets up said virtual private line and allows said stations to communicate only with each other, said system comprising the steps of:

releasing said lines from the control of said communication switching system in response to the detection of said simultaneously initiated calls while said stations are still off hook;
   determining that one of said signal converters is dominant if a predefined parameter is equal to a character stored in said signal converters; and
   generating in said dominant signal converter an originating supervisory signal that is sent to said communication switching system to establish a connection over said virtual private line while said stations are still off hook.

8. A system for eliminating a glare condition arising from two virtual private line calls initiated substantially at the same time by a) a first station connected to a first switch by a first link, and b) a second station connected to a second switch by a second link, said switches being part of a communication switching system which allows said stations to communicate only with each other, wherein said system comprising:

means for detecting in each switch said busy line condition;
   means for releasing said first link from said communication switching system control through the transmission of terminating supervisory signals by said second switch to said first switch while said stations are still off-hook;
   means for releasing said second link from said communication switching system control through the transmission of terminating supervisory signals by said first switch to said second switch while said stations are still off-hook; and
   means for selecting based on a predetermined criterion only one of said switches to initiate a new call, said new call being initiated by the selected switch sending an originating supervisory signal towards the other switch while both stations are still off-hook.

9. A system for completing simultaneously initiated virtual private line calls in order to establish a connection over a virtual private line between a first station and a second station which initiated said calls, wherein each station is connected via a line to a signal converter coupled to a communication switching system which sets up said virtual private line and allows said stations to communicate only with each other, said system comprising:

means for releasing said lines from the control of said communication switching system in response to the detection of said simultaneously initiated calls while said stations are still off hook;

means for determining that one of said signal converters is dominant if a predefined parameter is equal to a character stored in said signal converters; and     means for generating in said dominant signal converter an originating supervisory signal that is sent to said communication switching system to establish a connection over said virtual private line while said stations are still off hook.

* * * * *